Nov. 29, 1960 A. BRUEDER 2,961,831
PLAY TAKE-UP DEVICE FOR HYDRAULIC CONTROL SYSTEM
Filed July 8, 1957
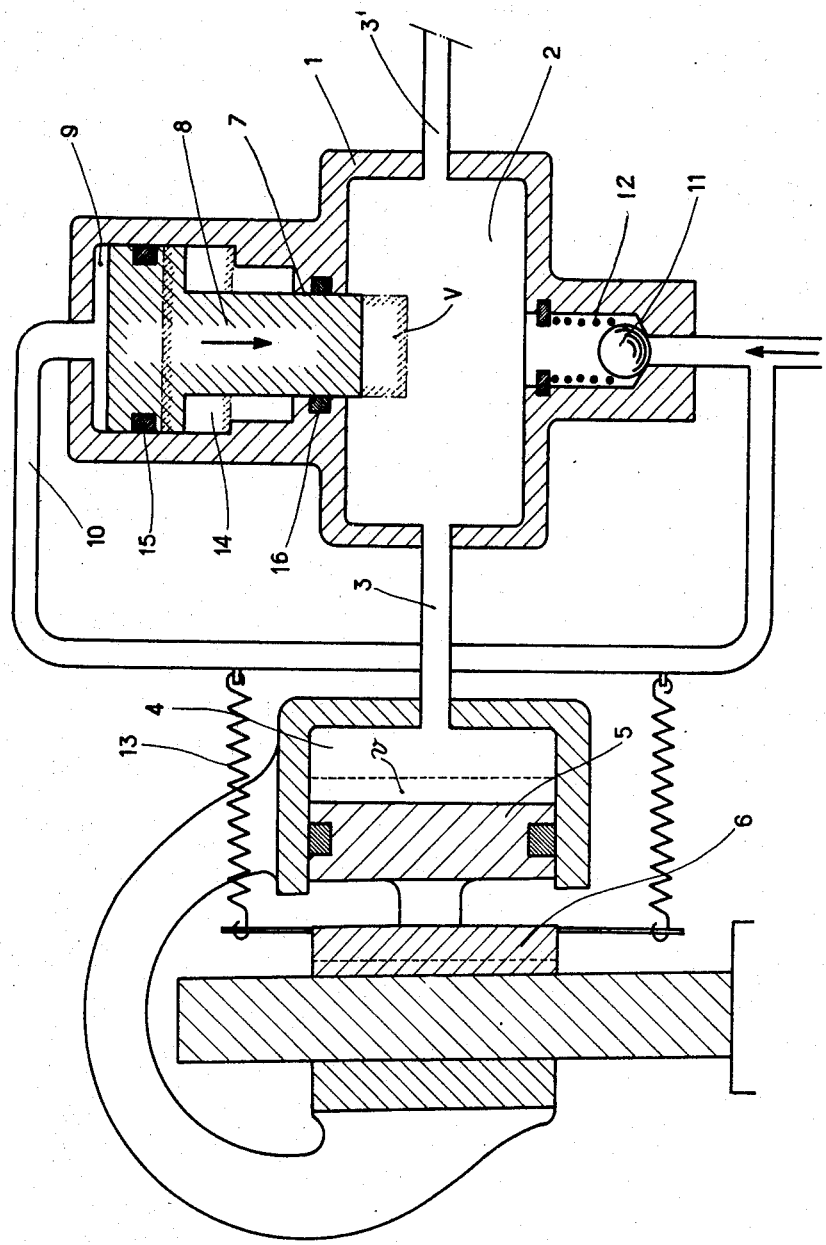

United States Patent Office 2,961,831
Patented Nov. 29, 1960

2,961,831

PLAY TAKE-UP DEVICE FOR HYDRAULIC CONTROL SYSTEM

Antoine Brueder, Paris, France, assignor to Societe Anonyme Andre Citroen, Paris, France, a corporation of France Filed July 8, 1957, Ser. No. 670,604

Claims priority, application France July 19, 1956

5 Claims. (Cl. 60—54.5)

The present invention relates in general to hydraulic control systems and has specific reference to a device for taking up play in systems of this character, whereby one or more mechanical members may be controlled or actuated while limiting to a predetermined amount the displacement of the movable part of each member concerned, irrespective of the degree of wear of the parts, so that only the quantity of hydraulic fluid under pressure which is strictly necessary for carrying out the operation is utilized.

Considering, for example, the brake system of an automotive vehicle, it is advantageous, in using the delivery of fluid under pressure for actuating the movable member of a brake, to employ only a very moderate proportion of this fluid under pressure.

Further, the present trend is towards reducing to a minimum value, the play between the linings and the surfaces co-acting therewith during brake applications, and also to keep this play to this minimum value irrespective of the degree of wear of the linings and also of the temperature of the hydraulic fluid, or any other cause likely to alter this play.

As a result, when an operation (for example a brake application) has been completed and the pressure removed or released, the movable member controlled by the hydraulic pressure should assume a position providing minimum clearance which position, due to wear occasioned by preceding operations, generally differs from the first such position; therefore, it is necessary that the movable member moves back but through a shorter distance in order to keep the gap at the same value between the linings and the surface co-acting therewith.

It is an object of this invention to provide a hydraulic play take-up device adapted to meet the requirements broadly set forth hereinabove such that a force applied will always attain the desired magnitude and so that the movable element, when resuming its inoperative position, recedes only through a distance corresponding to the selected clearance.

According to a preferred embodiment of the invention, a device is provided which comprises essentially a piston of the differential type mounted between the source of liquid under pressure and a chamber communicating with the thrust member of the movable element, this chamber being connected on the other hand with the liquid inlet through a valve permitting the ingress of liquid under pressure into this chamber to compensate, by an additional input of liquid, a possible increase in the volume of the chamber which might be caused for example by the wear of the controlled members.

The invention will be better understood if reference is made to the following description with reference to the attached drawings showing diagrammatically in its single figure a preferred embodiment of the invention.

Referring now to the drawing it will be seen that the device comprises a hollow body 1 forming a chamber 2 communicating through a pipe line or duct 3 with the cylinder 4 in which a piston 5 operatively connected to the movable member is slidably mounted. In the example illustrated the movable member is a support 6 carrying a brake lining; this support 6 is constantly urged to its inoperative position by spring means 13. Of course, this chamber may also be connected to other movable members to be controlled simultaneously through other pipe lines or ducts 3', etc. In this chamber 2 a bore 7 receives the smaller end of a differential piston 8 having its larger portion slidably mounted in a cylinder or chamber 9 adjacent to the chamber 2 and connected through a pipe line 10 to the supply of fluid under pressure.

This chamber 2 is also connected directly to the supply line 10 through a valve consisting in this case of a ball 11 urged by a spring 12 and so arranged as to permit the ingress of fluid under pressure in the chamber 2.

During the operation of the device the differential piston 8 may travel in the chamber 2 so as to occupy a volume (V) equal to the aggregate volumes (V) corresponding to the clearances of the members controlled by the device.

Thus, the delivery of fluid under pressure will not encounter any appreciable resistance until the operative surfaces of the controlled members do not engage each other, and the piston 8 cannot penetrate further into the chamber 2.

When this mutual engagement is obtained, the pressure in the pipe line 10 and chamber 2 begins to rise; if the piston 8 abuts to its end position when it is sunk by a volume (V) into the chamber 2 before the pressure in this chamber has attained the maximum value of the liquid in the input line, the valve 11 is unseated and allows the amount of liquid necessary to make up or equalize the pressure to flow into the chamber.

Of course, the strength of the spring 12 is so selected that it will not create any appreciable difference between the respective pressures in chamber 2 and pipe line 10.

When the pressure is released, the return springs 13 urge the movable members towards their inoperative position, but this movement is limited due to the piston 8 restoring the volume (V), the chamber 2 being closed again by the valve 11; the resulting limitation is exactly the quantity of play allowed for the movable members thus controlled.

When several members are controlled simultaneously, it is also necessary that they effect their return movement also simultaneously, otherwise one of them, by moving faster towards its inoperative position, would absorb a more or less important portion of the volume and would take more clearance than desired whilst the other members would be unable to take this clearance.

This requirement can be met very easily by correctly balancing and gaging the return springs, for the intensity of the force urging the members to their inoperative position is relatively low. Besides, it is possible to provide, if desired, a member adapted to restrict the output of the fluid under pressure in view of equalizing the return times.

Finally, it will be noted that the piston forms with respect to the chamber 9 a variable dead space 14 in which no hydraulic fluid should be present; to this end, adequate gaskets or packings 15, 16 are provided in the bore 7 and on the larger portion of the piston, as shown. If desired, this space may be vented to the atmosphere through an adequate orifice or duct.

I claim:
1. A device for taking up play in a hydraulic control system having a movable member comprising: means defining a chamber, a source of pressure fluid, a one-way valve connecting the source to the chamber for supplying the latter with fluid at a predetermined pressure, a cylinder coupled to the chamber, a differential piston in the cylinder and including a large portion and a small portion, the small portion being adapted to project into the chamber, means operatively coupling the chamber directly to said movable member to control the latter by fluid pressure, and means directly coupling said source to and in open communication with said cylinder adjacent the large portion of said piston, the movement of the small portion in said chamber compensating movements of said movable member.

2. A device as claimed in claim 1 wherein the cylinder and chamber are parts of a single unit and are connected by a bore slidably accommodating the small portion of said piston.

3. A device as claimed in claim 1 wherein the valve is a spring-loaded ball valve.

4. A device as claimed in claim 1 comprising a spring coupled to the movable member and urging the latter in a direction whereby fluid is forced back into said chamber.

5. A device for taking up play in a hydraulic control system having a movable member comprising: means defining a chamber, a source of pressure fluid, a cylinder coupled to said chamber, a differential piston in said cylinder and including a large portion and a small portion, said small portion being adapted to project into said chamber, means directly coupling said source to and in open communication with said cylinder adjacent said large portion of said piston, a single one-way valve connecting said source directly to said chamber for supplying the latter with fluid at a predetermined pressure, conduit means directly and operatively coupling said chamber directly to said movable member for control thereof by fluid pressure, and means directly coupling said source to and in open communication with said cylinder adjacent said large portion of said piston, the movement of said small portion in said chamber compensating movements of said movable member.

References Cited in the file of this patent

UNITED STATES PATENTS

| | | |
|---|---|---|
| 1,569,143 | Robinson | Jan. 12, 1926 |
| 1,764,179 | Loughead | June 17, 1930 |
| 1,885,235 | Davis | Nov. 1, 1932 |
| 2,275,697 | Stelzer | Mar. 10, 1942 |
| 2,321,479 | Freeman | June 8, 1943 |
| 2,385,625 | Hopmans | Sept. 25, 1945 |
| 2,656,745 | Forichon | Oct. 27, 1953 |

FOREIGN PATENTS

| | | |
|---|---|---|
| 1,034,547 | France | Apr. 8, 1953 |